US010736058B2

(12) United States Patent
Xie et al.

(10) Patent No.: US 10,736,058 B2
(45) Date of Patent: Aug. 4, 2020

(54) ADJUSTMENT OF TIMING ADVANCE VALUES IN MOBILE DEVICES

(71) Applicant: QUALCOMM Incorporated, San Diego, CA (US)

(72) Inventors: Ling Xie, Beijing (CN); Chintan Shirish Shah, San Diego, CA (US); Jiming Guo, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/552,917

(22) PCT Filed: Apr. 7, 2015

(86) PCT No.: PCT/CN2015/075953
§ 371 (c)(1),
(2) Date: Aug. 23, 2017

(87) PCT Pub. No.: WO2016/161545
PCT Pub. Date: Oct. 13, 2016

(65) Prior Publication Data
US 2018/0035397 A1 Feb. 1, 2018

(51) Int. Cl.
*H04W 56/00* (2009.01)
*H04W 72/04* (2009.01)
(52) U.S. Cl.
CPC ....... *H04W 56/0005* (2013.01); *H04W 56/00* (2013.01); *H04W 72/048* (2013.01); *H04W 72/0446* (2013.01)
(58) Field of Classification Search
CPC .................................................. H04W 56/0005
See application file for complete search history.

(56) References Cited

U.S. PATENT DOCUMENTS 6,072,847 A 6/2000 Dupuy et al.
7,167,482 B1 * 1/2007 Menzel ............ H04W 72/0446
370/337
(Continued)

FOREIGN PATENT DOCUMENTS

CN 101154984 A 4/2008
CN 101841778 A 9/2010
(Continued)

OTHER PUBLICATIONS

International Search Report and Written Opinion—PCT/CN2015/075953—ISAEPO—dated Dec. 2, 2015.
(Continued)

*Primary Examiner* — Parth Patel
(74) *Attorney, Agent, or Firm* — The Marbury Law Group, PLLC

(57) ABSTRACT

Various embodiments include methods for adjusting timing advance values on a mobile communication device that includes receiving, on the mobile communication device, a timing advance adjustment value from a base station and determining whether the timing advance adjustment value exceeds an adjustment threshold. The mobile communication device may ignore the timing advance adjustment value in response to determining that the timing advance adjustment value exceeds the adjustment threshold, and may adjust a timing advance value stored on the mobile communication device by the timing advance adjustment value in response to determining that the timing advance adjustment value does not exceed the adjustment threshold.

19 Claims, 6 Drawing Sheets

(56) References Cited

U.S. PATENT DOCUMENTS

| | | | |
|---|---|---|---|
| 8,295,843 B2* | 10/2012 | Hanov | H04W 48/20 |
| | | | 455/436 |
| 8,983,396 B2 | 3/2015 | Nukala et al. | |
| 8,989,128 B2 | 3/2015 | Dinan | |
| 9,320,001 B2* | 4/2016 | Park | H04W 56/0005 |
| 2004/0128095 A1 | 7/2004 | Oestreich | |
| 2009/0232107 A1* | 9/2009 | Park | H04B 7/2681 |
| | | | 370/336 |
| 2010/0120443 A1* | 5/2010 | Ren | H04W 56/0005 |
| | | | 455/450 |
| 2010/0177747 A1* | 7/2010 | Chun | H04W 56/009 |
| | | | 370/336 |
| 2010/0220713 A1* | 9/2010 | Tynderfeldt | H04W 56/0005 |
| | | | 370/350 |
| 2010/0254356 A1* | 10/2010 | Tynderfeldt | H04W 56/0005 |
| | | | 370/336 |
| 2011/0085491 A1* | 4/2011 | Tynderfeldt | H04W 56/0005 |
| | | | 370/315 |
| 2011/0176522 A1* | 7/2011 | Choi | H04W 56/0045 |
| | | | 370/336 |
| 2011/0249550 A1* | 10/2011 | Luz | H04W 56/0045 |
| | | | 370/216 |
| 2012/0014371 A1* | 1/2012 | Weng | H04J 3/0682 |
| | | | 370/350 |
| 2012/0294173 A1 | 11/2012 | Su et al. | |
| 2013/0028198 A1* | 1/2013 | Yamada | H04W 56/0005 |
| | | | 370/329 |
| 2013/0100938 A1* | 4/2013 | Kwon | H04L 27/2655 |
| | | | 370/336 |
| 2013/0195084 A1* | 8/2013 | Chen | H04W 72/0413 |
| | | | 370/336 |
| 2013/0230002 A1* | 9/2013 | Ohta | H04W 56/0045 |
| | | | 370/329 |
| 2013/0242973 A1* | 9/2013 | Bertrand | H04W 56/0005 |
| | | | 370/350 |
| 2013/0244719 A1* | 9/2013 | Nukala | H04W 56/0005 |
| | | | 455/550.1 |
| 2013/0260758 A1 | 10/2013 | Zhao et al. | |
| 2013/0279433 A1* | 10/2013 | Dinan | H04W 52/146 |
| | | | 370/329 |
| 2014/0010218 A1* | 1/2014 | Persson | H04W 56/0045 |
| | | | 370/337 |
| 2014/0086219 A1* | 3/2014 | Suzuki | H04W 56/0005 |
| | | | 370/336 |
| 2014/0092855 A1* | 4/2014 | Ahn | H04W 74/0833 |
| | | | 370/329 |
| 2014/0098798 A1 | 4/2014 | Khandekar et al. | |
| 2014/0105192 A1* | 4/2014 | Park | H04W 56/00 |
| | | | 370/336 |
| 2014/0369322 A1 | 12/2014 | Fwu et al. | |
| 2015/0163637 A1* | 6/2015 | Castmo | H04W 4/029 |
| | | | 455/456.1 |
| 2015/0230194 A1* | 8/2015 | Yang | H04L 5/0051 |
| | | | 370/337 |
| 2015/0334637 A1* | 11/2015 | Kim | H04W 48/12 |
| | | | 370/312 |
| 2016/0057752 A1* | 2/2016 | Ahn | H04W 72/04 |
| | | | 370/329 |
| 2016/0088577 A1* | 3/2016 | Cui | H04W 52/54 |
| | | | 370/336 |
| 2016/0165490 A1* | 6/2016 | Nagasaka | H04L 5/0035 |
| | | | 370/331 |
| 2016/0295532 A1* | 10/2016 | Cao | H04W 56/001 |
| 2017/0048038 A1* | 2/2017 | Seo | H04W 76/14 |
| 2018/0041908 A1* | 2/2018 | Faxer | H04W 16/18 |
| 2018/0368182 A1* | 12/2018 | Jiang | H04W 76/27 |
| 2019/0268853 A1* | 8/2019 | Dinan | H04W 52/146 |

FOREIGN PATENT DOCUMENTS

| | | | | |
|---|---|---|---|---|
| CN | 102065535 A | | 5/2011 | |
| EP | 2408243 A1 | | 1/2012 | |
| JP | 2011503959 A | | 1/2011 | |
| WO | 2009061255 A1 | | 5/2009 | |
| WO | WO-2009061255 A1 | * | 5/2009 | ........ H04W 56/0045 |
| WO | 2013112320 A1 | | 8/2013 | |
| WO | 2014059116 A1 | | 4/2014 | |

OTHER PUBLICATIONS

Supplementary European Search Report—EP15888102—Search Authority—The Hague—dated Oct. 19, 2018, 7 pages.

* cited by examiner

ADJUSTMENT OF TIMING ADVANCE VALUES IN MOBILE DEVICES

BACKGROUND

Some new designs of mobile communication devices-such as smart phones, tablet computers, and laptop computers-contain one or more Subscriber Identity Module ("SIM") modules (e.g., cards) that provide users with access to multiple separate mobile telephony networks. Examples of mobile telephony networks include GSM, LTE, TD-SCDMA, CDMA2000, and WCDMA. A mobile communication device that includes one or more SIMs and connects to two or more separate mobile telephony networks using one or more shared radio frequency ("RF") resources/radios is termed a multi-SIM communication device. One example is a dual-SIM dual standby ("DSDS") communication device, which includes two SIM cards/subscriptions that are each associated with a separate radio access technology ("RAT"), and the separate RATs share one RF chain to communicate with two separate mobile telephony networks on behalf of their respective subscriptions. When one RAT is using the RF resource, the other RAT is in stand-by mode and is not able to communicate using the RF resource.

One consequence of having a plurality of RATs that maintain network connections simultaneously is that the RATs may sometimes interfere with each other's communications. For example, two RATs on a DSDS communication device utilize a shared RF resource to communicate with their respective mobile telephony networks, and only one RAT may use the RF resource to communicate with the RAT's mobile network at a time. Even when a RAT is in an "idle-standby" mode, meaning that the RAT is not actively communicating with the network, the RAT may still need to periodically receive access to the shared RF resource in order to perform various network operations. For example, an idle RAT may need the shared RF resource at regular intervals to perform idle-mode operations to receive network paging messages in order to remain connected to the network on behalf of the RAT's subscription.

In conventional multi-SIM communication devices, the RAT actively using an RF resource that is shared with an idle RAT may occasionally be forced to interrupt the active RAT's RF operations so that the idle RAT may use the shared RF resource to perform the idle RAT's idle-standby mode operations (e.g., paging monitoring, cell reselection, system information monitoring, etc.). This process of switching access of the shared RF resource from the active RAT to the idle RAT is sometimes referred to as a "tune-away," as the RF resource tunes away from the active RAT's frequency band or channel and tune to the idle RAT's frequency bands or channels. After the idle RAT has finished network communications, access to the RF resource may switch from the idle RAT to the active RAT via a "tune-back" operation.

A network base station may utilize timing advance values to communicate with mobile communication devices that are camped on the base station. Timing advance values are used by a mobile communication device to adjust for signal propagation delays that occur due to a number of factors, including differences in distance between the mobile communication devices and the base station. For example, a base station may communicate with two mobile communication devices, one located next to the base station and other located five kilometers away from the base station. Uplink communications sent by the mobile communication device next to the base station are received by the base station almost instantaneously. However, uplink communications sent by the mobile communication device five kilometers away arrive at the base station after a certain delay period because of the distance traveled by the uplink signal.

Network base stations usually assign specific time slots in which to receive communications from each mobile communication device camped on the base station. If all the mobile communication devices are the same distance from the base station, then the base station receives communications from each mobile communication device without conflict. However, when the mobile communication devices are varying distances from the base station, the base station may receive one mobile communication device's uplink communication before the base station is finished receiving another device's uplink communication. The base station utilizes timing advances to avoid reception conflicts. The base station calculates a timing advance adjustment value for each mobile communication device and sends the adjustment values to each mobile communication device. The timing advance adjustment value is based on a change in the transmit time (e.g., due to a change in distance) between the mobile communication device and the base station since the last time the timing advance was determined. Each mobile communication device offsets the timing of communications with the base station by the received timing advance adjustment value so that the base station receives communications from all mobile communication devices camped on the base station at the appropriate time. As a mobile communication device moves toward or away from the base station, the base station may periodically send timing advance adjustment values that further adjust the prior timing advance values on the mobile communication device.

In some instances, the base station may calculate an erroneous timing advance adjustment value. This may occur, for example, after a tune-away by the mobile communication device to another network. In such instances, the base station may send the erroneous timing advance adjustment value to the mobile communication device. If the mobile communication device adjusts the prior timing advance value using the erroneous timing advance adjustment value, the subsequent uplink communications from the mobile communication device may conflict with communications from other devices at the base station. This may result in loss of the uplink connection between the mobile communication device and the base station. In this situation, it may take a long time for the mobile communication device and the base station to reestablish the uplink connection.

SUMMARY

Various embodiments include methods for adjusting timing advance values that may be implemented on a mobile communication device that may include determining whether a timing advance adjustment value received in the mobile communication device exceeds an adjustment threshold, and ignoring the timing advance adjustment value in response to determining that the timing advance adjustment value exceeds the adjustment threshold. In some embodiments, such methods may further include adjusting a timing advance value stored on the mobile communication device by the timing advance adjustment value in response to determining that the timing advance adjustment value does not exceed the adjustment threshold. In some embodiments, the timing advance adjustment value may be received after a tune-away from a base station by the mobile communication device. In some embodiments, ignoring the timing advance adjustment value may include utilizing a timing advance value previously stored on the mobile communication device to communicate with a base station. In some embodiments, the adjustment threshold may be a value consistent with a maximum distance that the mobile communication device could reasonably travel during a specified time frame.

In some embodiments, such methods may further include determining whether the timing advance adjustment value is received after a predetermined number of sub-frames after the tune-away is completed, and adjusting a timing advance value stored on the mobile communication device by the timing advance adjustment value in response to determining that the timing advance adjustment value is received after a predetermined number of sub-frames after the tune-away is completed.

In some embodiments, such methods may further include determining whether the mobile communication device has reestablished an uplink connection with a network after a predetermined amount of time after ignoring the timing advance adjustment value, and performing a random channel access procedure in response to determining that the mobile communication device has not reestablished the uplink connection with the network after the predetermined amount of time after ignoring the timing advance adjustment value.

Various embodiments may include a mobile communication device having a radio frequency resource, a memory, and a processor configured to connect to two or more Subscriber Identity Module ("SIM") modules and configured with processor-executable instructions to perform operations of the methods described above. Various embodiments may include a mobile communication device having means for performing functions of the methods described above. A non-transitory processor-readable storage medium on which are stored processor-executable instructions configured to cause a processor of a mobile communication device to perform operations of the methods described above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the disclosed systems and methods.

DETAILED DESCRIPTION

Figure 1:
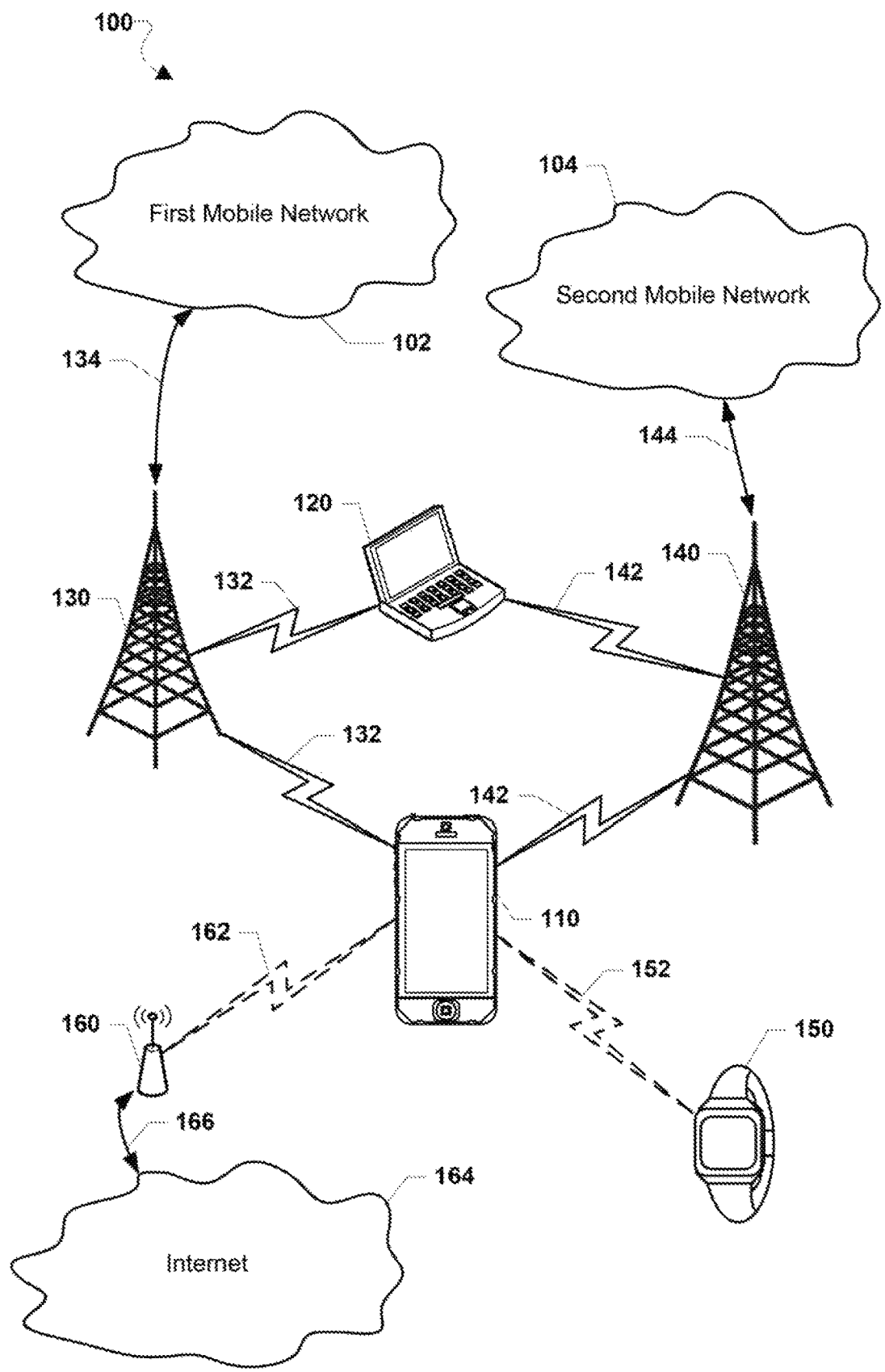
FIG. 1 is a communication system block diagram of mobile telephony networks suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the written description or the claims.

The various embodiments include methods for adjusting timing advance values on a mobile communication device that include determining whether a timing advance adjustment value received in the mobile communication device exceeds an operations adjustment threshold, and ignoring the timing advance adjustment value in response to determining that the timing advance adjustment value exceeds the adjustment threshold.

As used herein, the term "multi-SIM communication device" or "multi-SIM device" refers to any one or all of cellular telephones, smart phones, personal or mobile multimedia players, personal data assistants, laptop computers, tablet computers, smart books, palm-top computers, wireless electronic mail receivers, multimedia Internet-enabled cellular telephones, wireless gaming controllers, and similar personal electronic devices that includes one or more SIM modules (e.g., SIM cards), a programmable processor, memory, and circuitry for connecting to at least two mobile communication network with one or more shared RF resources. Various embodiments may be useful in mobile communication devices, such as smart phones, and so such devices are referred to in the descriptions of various embodiments. However, the embodiments may be useful in any electronic devices that may individually maintain a plurality of RATs that utilize at least one shared RF chain, which may include one or more of antennae, radios, transceivers, etc. Multi-SIM communication devices may be configured to operate in DSDS mode or DSDA mode.

As used herein, the terms "SIM module," "SIM card," and "subscriber identification module" are used interchangeably to refer to a memory module that may be an integrated circuit or embedded into a removable card, and that stores an International Mobile Subscriber Identity (IMSI), related key, and/or other information used to identify and/or authenticate a multi-standby communication device on a network and enable a communication service with the network. Because the information stored in a SIM enables the multi-SIM communication device to establish a communication link for a particular communication service with a particular network, the term "subscription" is used herein as a shorthand reference to refer to the communication service associated with and enabled by the information stored in a particular SIM as the SIM and the communication network, as well as the services and subscriptions supported by that network, correlate to one another.

In the case of a multi-SIM communication device, two or more RATs may function on the same device. For example, a dual-SIM device may support both LTE and GSM technologies. The dual-SIM communication may be configured as a DSDS device, meaning that both RATs share one RF resource and only one RAT may be active at any one time, with the other RAT in standby mode.

In any multi-SIM communication device, there is the potential for the communication activity of one RAT subscription to interfere with the communication activity of another RAT subscription. For DSDS devices, interference may come in the form of a tune-away. DSDS devices having an active subscription and an idle subscription may occasionally need to tune away from the active subscription to the idle subscription in order to enable the second subscription to perform various tune-away operations. Such tune-away operations may include one or more of page monitoring, system information monitoring (e.g., receiving and decoding a broadcast control channel), cell reselection measurements to determine whether to initiate reselection operations to a neighboring cell, updating the idle subscription's network with the DSDS communication device's current location, receiving Short Message Service (SMS) messages, and receiving mobile-terminated calls. While the idle subscription has access to the shared RF resource in order to perform tune-away operations, the active subscription's communication activities may be interrupted, causing the active subscription to partially receive or lose data/entire messages sent from the active subscription's network during the tune-away event.

Network base stations utilize timing advances to compensate for propagation delays in communications with mobile communication devices. Propagation delays occur because mobile communication devices are located at varying distances from the base station and thus the time it takes for a signal from the mobile communication device to reach the base station varies. Base stations, such as eNodeBs for LTE networks, typically assign discrete time slots to receive communications from each mobile communication device camped on the base station. In the absence of timing advances, communications from various devices may overlap at the base station, resulting in the base station dropping connections with some of the mobile communication devices.

A base station may utilize time tracking loops to track timing advance values for each mobile communication device camps to the base station. A timing advance value may be expressed as an integer, for example an integer between 0-63, with each integer corresponding to a unit of time, for example approximately a half microsecond (0.5 µs). Thus a timing advance value of 2 may indicate that the mobile communication device should transmit an uplink communication approximately one microsecond before the device's allotted time slot at the base station (i.e., advance the uplink communication time), while a timing advance value of −2 may indicate that the mobile communication device should transmit an uplink communication approximately one microsecond after the device's allotted time slot at the base station (i.e., delay the uplink communication time).

The base station may calculate the uplink timing of a mobile communication device by determining the amount of time the base station takes to receive uplink signals sent by the mobile communication device. The base station may generate a timing advance adjustment value based on the uplink timing. The timing advance adjustment value may counteract a number of factors that influence uplink timing, including the change in distance between the mobile communication device and the base station, changes in the propagation environment, oscillation drift in the mobile communication device, and other RF propagation effects not related to a change in distance. The base station may send the timing advance adjustment value to the mobile communication device. The mobile communication device offsets communications to the base station according to the timing advance adjustment value (e.g., sending the communication earlier so that it reaches the base station at the allotted time slot). The mobile communication device may initially have a timing advance value of zero when the uplink connection is first established. The timing advance value is then adjusted periodically or aperiodically by the base station.

The base station may periodically or aperiodically recalculate the uplink timing between the base station and mobile communication device. For example, if the base station determines that the mobile communication device has moved toward or away from the base station (e.g., the device is in a car traveling away from the base station), the base station may generate a timing advance adjustment value. The timing advance adjustment value adjusts the prior timing advance value on the mobile communication device based on the change in uplink timing between the base station and the mobile communication device. That is, the timing advance adjustment value is relative to the last determined timing advance value on the mobile communication device. For example, if the timing advance value for a mobile communication device is currently 2, and the mobile communication device has moved away from the base station since the last time the timing advance was determined, the timing advance adjustment value generated by the base station may be 1. The mobile communication device receives the timing advance adjustment value and adjusts the prior timing advance value of 2, resulting in a new timing advance value of 3. On the other hand, if the mobile communication device has moved closer to the base station then the new advance timing value may be −1. The mobile communication device receives the timing advance adjustment value and adjusts the prior timing advance value of 2, resulting in a new timing advance value of 1. The base station sends the timing advance adjustment value to the mobile communication device, which adjusts the timing advance value stored on the mobile communication device accordingly.

Occasionally, the base station may make an error in determining the timing advance adjustment value (e.g., the change in distance between the base station and the mobile communication device since the last determination). For example, this may occur in a DSDS device after a tune-away from one network to another network. During the tune-away the active subscription is not in communication with active subscription's associated network. After the tune-away the base station may make an error in determining where the mobile communication device is and thus may generate an erroneous timing advance adjustment value. For example, the base station may generate a timing advance adjustment value of 20 after a tune-away, which may imply that the mobile communication device has moved many kilometers during the duration of the tune-away (on the order of milliseconds). Such a timing advance adjustment value is clearly erroneous. If such an erroneous value is sent to the mobile communication device, and the mobile communication device adjusts the stored timing advance value accordingly, communications with the base station (i.e., uplink transmission) may not arrive at the allotted time slot at the base station and may collide with another device's transmission to the base station. When this occurs, the uplink connection between the mobile communication device and the base station may be dropped. It may take a long time for the mobile communication device and the base station to reestablish the connection and determine the correct timing advance value. The network base station may also increase the redundancy of the modulation and coding scheme used for the mobile communication device, leading to a decrease in throughput even after the uplink connection is restored.

To overcome this problem, the various embodiments provide methods implemented with a processor of a mobile communication device (e.g., a mobile communication device) for adjusting timing advance values on a mobile communication device that may ignore timing advance adjustment values that are likely erroneous.

In the various embodiments, the mobile communication device may be a multi-SIM communication device, for example a DSDS device where two subscriptions, associated with different networks, share one RF resource. As an example, the subscriptions may be a LTE subscription and a GSM subscription. After a tune-away from an active subscription (e.g., LTE) to an idle subscription (e.g., GSM), the network base station of the active subscription may calculate and send a timing advance adjustment value to the mobile communication device. When the mobile communication device receives a timing advance adjustment value, a processor of the mobile communication device may determine whether a certain number N of sub-frames have passed since the end of the tune-away. If less than N sub-frames have passed, the mobile communication device may determine whether the timing advance adjustment value exceeds an adjustment threshold. In response to determining that the timing advance adjustment value exceeds the threshold, the mobile communication device may ignore the timing advance adjustment value sent by the network. In other words, if the timing advance adjustment value exceeds the threshold the mobile communication device does not change the timing advance value stored on the mobile communication device. If the timing advance adjustment value is within the adjustment threshold, or if more than N sub-frames have passed since the end of the tune-away, the mobile communication device may adjust the timing advance value by the timing advance adjustment value received from the network.

If ignoring the timing advance adjustment value does not lead to quick restoration of a network uplink connect, the mobile communication device may use convention methods to restore the uplink connection. To do so, the mobile communication device may determine whether the uplink connection with the network has been restored. If the uplink connection has been restored, the mobile communication device may operate as usual. If the uplink connection has not been restored, the mobile communication device may determine whether a predetermined amount of time (e.g., X milliseconds) has elapsed since the first time that the mobile communication device ignored a timing advance adjustment value from the base station. If the predetermined amount of time has not elapsed, the mobile communication device may continue to receive timing advance adjustment values from the network and compare the values to the adjustment threshold. If the predetermined amount of time has elapsed, the mobile communication device may initiate a random access channel (RACH) procedure to reestablish the uplink connection with the network base station.

Various embodiments may be implemented within a variety of communication systems 100, such as at least two mobile telephony networks, an example of which is illustrated in FIG. 1. A first mobile network 102 and a second mobile network 104 typically each include a plurality of cellular base stations (e.g., a first base station 130 and a second base station 140). A first multi-SIM communication device 110 may be in communication with the first mobile network 102 through a cellular connection 132 to the first base station 130. The first multi-SIM communication device 110 may also be in communication with the second mobile network 104 through a cellular connection 142 to the second base station 140. The first base station 130 may be in communication with the first mobile network 102 over a wired connection 134. The second base station 140 may be in communication with the second mobile network 104 over a wired connection 144.

A second multi-SIM communication device 120 may similarly communicate with the first mobile network 102 through the cellular connection 132 to the first base station 130. The second multi-SIM communication device 120 may also communicate with the second mobile network 104 through the cellular connection 142 to the second base station 140. The cellular connections 132 and 142 may be made through two-way wireless communication links, such as 4G LTE, 3G, CDMA, TDMA, WCDMA, GSM, and other mobile telephony communication technologies.

The multi-SIM communication devices 110, 120 may be different distances away from the first base station 130 and the second base station 140. For example, the multi-SIM communication device 110 may be much closer to the first base station 130 than the multi-SIM communication device 120. The first base station 130 may maintain a time tracking loop for the multi-SIM communication devices 110, 120 to keep track of the distance between the multi-SIM communication devices 110, 120 and the first base station 130. The time tracking loops may be used to generate timing advance adjustment values for the multi-SIM communication devices 110, 120, which depend on the change in distance between the first base station 130 and the multi-SIM communication devices 110, 120. The multi-SIM communication devices 110, 120 may each maintain timing advance values, which are adjusted by timing advance adjustment values calculated by the first base station 130 and transmitted to each of the multi-SIM communication devices 110, 120. The second base station 140 may also maintain a time tracking loop for the multi-SIM communication devices 110, 120 similarly to the first base station 130.

While the multi-SIM communication devices 110, 120 are shown connected to the first mobile network 102 and, optionally, to the second mobile network 104, in some embodiments (not shown), the multi-SIM communication devices 110, 120 may include two or more subscriptions to two or more mobile networks and may connect to those subscriptions in a manner similar to those described above.

In some embodiments, the first multi-SIM communication device 110 may optionally establish a wireless connection 152 with a peripheral device 150 used in connection with the first multi-SIM communication device 110. For example, the first multi-SIM communication device 110 may communicate over a Bluetooth® link with a Bluetooth-enabled personal computing device (e.g., a "smart watch"). In some embodiments, the first multi-SIM communication device 110 may optionally establish a wireless connection 162 with a wireless access point 160, such as over a Wi-Fi connection. The wireless access point 160 may be configured to connect to the Internet 164 or another network over a wired connection 166.

While not illustrated, the second multi-SIM communication device 120 may similarly be configured to connect with the peripheral device 150 and/or the wireless access point 160 over wireless links.

Figure 2:
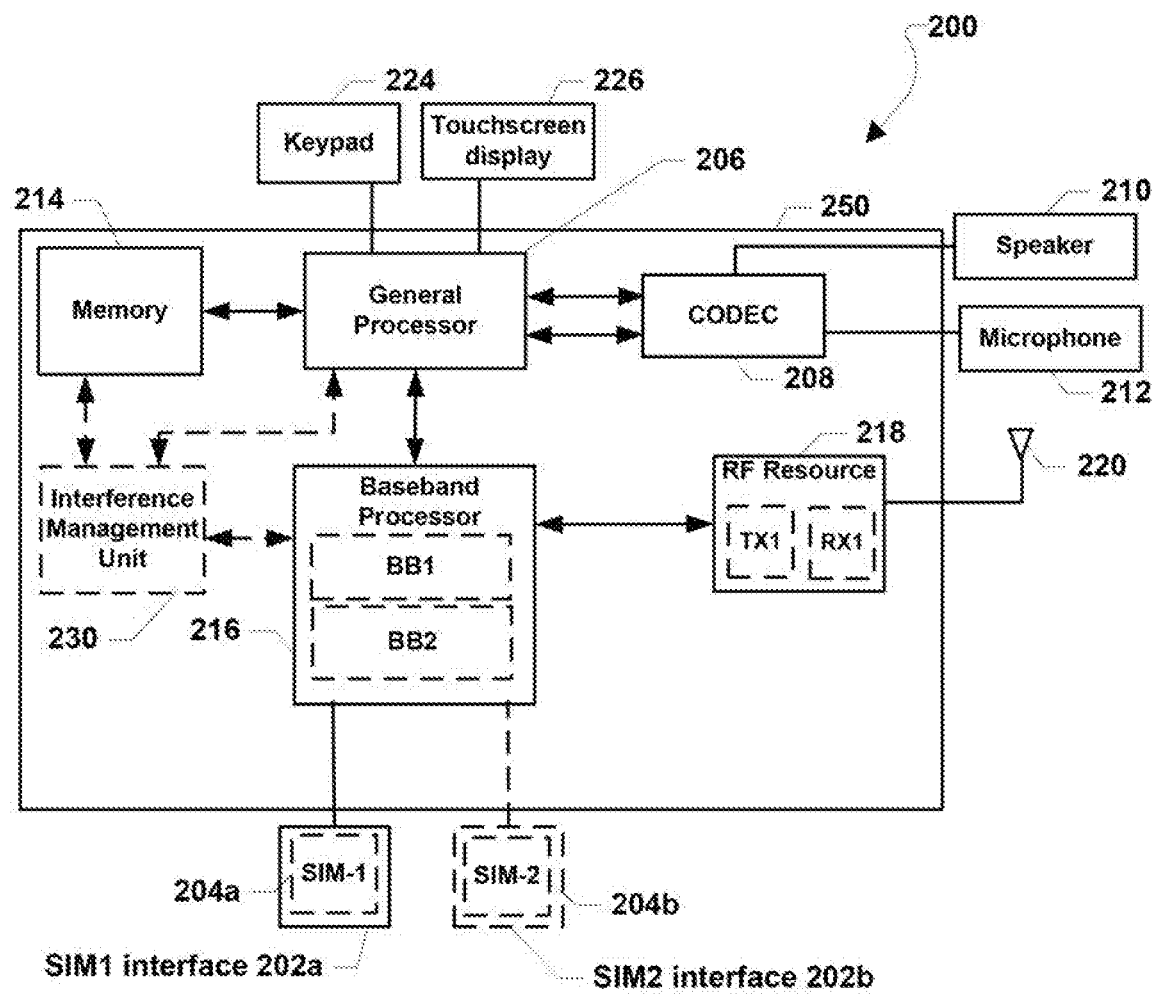
FIG. 2 is a component block diagram of a multi-SIM communication device according to various embodiments.

FIG. 2 is a functional block diagram of a multi-SIM communication device 200 suitable for implementing various embodiments. With reference to FIGS. 1-2, the multi-SIM communication device 200 may be similar to one or more of the multi-SIM communication devices 110, 120 as described. The multi-SIM communication device 200 may include a first SIM interface 202a, which may receive a first identity module SIM-1 204a that is associated with a first subscription. The multi-SIM communication device 200 may also optionally include a second SIM interface 202b, which may receive an optional second identity module SIM-2 204b that is associated with a second subscription. Optionally, the multi-SIM communication device 200 comprises an interference management unit 230.

A SIM in various embodiments may be a Universal Integrated Circuit Card (UICC) that is configured with SIM and/or USIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. A SIM card may have a CPU, ROM, RAM, EEPROM and I/O circuits.

A SIM used in various embodiments may contain user account information, an international mobile subscriber identity (IMSI), a set of SIM application toolkit (SAT) commands, and storage space for phone book contacts. A SIM card may further store home identifiers (e.g., a System Identification Number (SID)/Network Identification Number (NID) pair, a Home PLMN (HPLMN) code, etc.) to indicate the SIM card network operator provider. An Integrated Circuit Card Identity (ICCID) SIM serial number may be printed on the SIM card for identification. However, a SIM may be implemented within a portion of memory of the multi-SIM communication device 200 (e.g., in a memory 214), and thus need not be a separate or removable circuit, chip or card.

The multi-SIM communication device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to the memory 214. The memory 214 may be a non-transitory computer-readable storage medium that stores processor-executable instructions. For example, the instructions may include routing communication data relating to the first or second subscription though a corresponding baseband-RF resource chain.

The memory 214 may store an operating system (OS), as well as user application software and executable instructions. The memory 214 may also store application data, such as an array data structure. The memory 214 may also store timing advance values for determining timing offsets for communicating with network base stations.

The general processor 206 and the memory 214 may each be coupled to at least one baseband modem processor 216. Each SIM and/or RAT in the multi-SIM communication device 200 (e.g., the SIM-1 204a and/or the SIM-2 204b) may be associated with a baseband-RF resource chain. A baseband-RF resource chain may include the baseband modem processor 216, which may perform baseband/modem functions for communications with/controlling a RAT, and may include one or more amplifiers and radios, referred to generally herein as RF resources (e.g., RF resource 218). In some embodiments, baseband-RF resource chains may share the baseband modem processor 216 (i.e., a single device that performs baseband/modem functions for all RATs on the multi-SIM communication device 200). In other embodiments, each baseband-RF resource chain may include physically or logically separate baseband processors (e.g., BB1, BB2).

The RF resource 218 may be a transceiver that performs transmit/receive functions for each of the SIMs/RATs on the multi-SIM communication device 200. The RF resource 218 may include separate transmit and receive circuitry, or may include a transceiver that combines transmitter and receiver functions. In some embodiments, the RF resource 218 may include multiple receive circuitries. The RF resource 218 may be coupled to a wireless antenna (e.g., a wireless antenna 220). The RF resource 218 may also be coupled to the baseband modem processor 216.

In some embodiments, the general processor 206, the memory 214, the baseband processor(s) 216, and the RF resource 218 may be included in the multi-SIM communication device 200 as a system-on-chip 250. In some embodiments, the first and second SIMs 204a, 204b and their corresponding interfaces 202a, 202b may be external to the system-on-chip 250. Further, various input and output devices may be coupled to components on the system-on-chip 250, such as interfaces or controllers. Example user input components suitable for use in the multi-SIM communication device 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in the multi-SIM communication device 200 to enable communication between them, as is known in the art.

Functioning together, the two SIMs 204a, 204b, the baseband processor BB1. BB2, the RF resource 218, and the wireless antennas 220, 221 may constitute two or more radio access technologies (RATs). For example, the multi-SIM communication device 200 may be a SRLTE communication device that includes a SIM, baseband processor, and RF resource configured to support two different RATs, such as LTE and GSM. More RATs may be supported on the multi-SIM communication device 200 by adding more SIM cards, SIM interfaces, RF resources, and antennae for connecting to additional mobile networks.

In some embodiments (not shown), the multi-SIM communication device 200 may include, among other things, additional SIM cards, SIM interfaces, a plurality of RF resources associated with the additional SIM cards, and additional antennae for supporting subscriptions communications with additional mobile networks.

Figure 3:
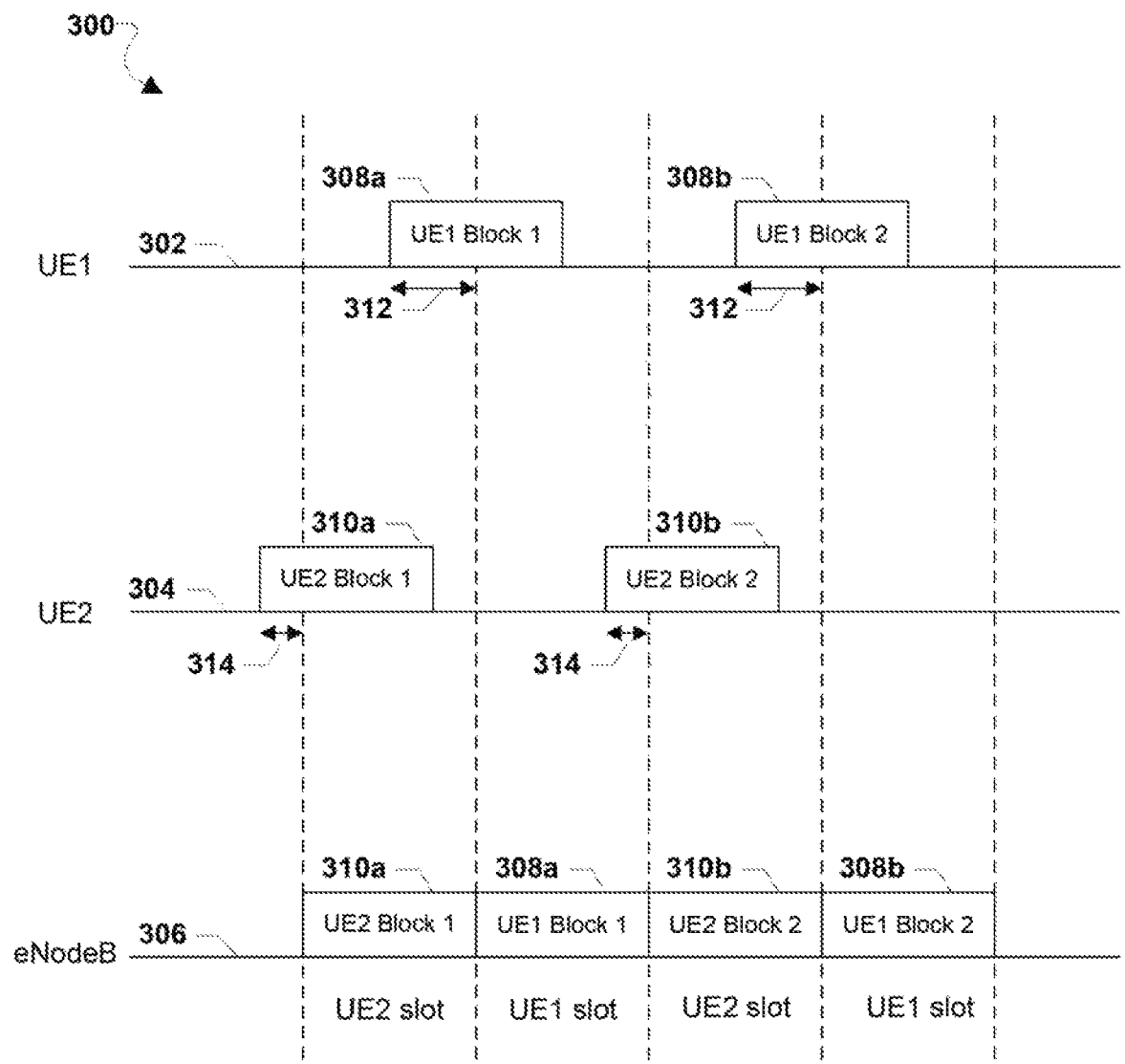
FIG. 3 is a timing diagram illustrating the operation of timing advances for mobile communication devices in communication with a network base station.

FIG. 3 illustrates the operation of timing advances for a network base station, such as an eNodeB station for a LTE network. With reference to FIGS. 1-3, a timing diagram 300 shows uplink transmissions for a first mobile communication device 302 (e.g. 110, 200), labeled UE1, and a second mobile communication device 304, labeled UE2. The mobile communication devices 302 and 304 communicate with a base station 306 (e.g., 130, 140 in FIG. 1), labeled eNodeB. In the illustrated example, the mobile communication devices 302 and 304 are different distances away from the base station 306. For example, mobile communication device 302 may be farther from base station 306 than the mobile communication device 304. The base station 306 allots specific time slots to receive transmissions from the mobile communication devices 302, 304, illustrated by vertical dashed lines in the diagram 300. The base station 306 may have time tracking loops that generate timing advance adjustment values for the mobile communication devices 302, 304.

The mobile communication device 304 may transmit data blocks 310a, 310b with a timing advance value 314. The timing advance value 314 may represent a time offset in which the mobile communication 304 should transmit the data blocks 310a, 310b so that the data blocks 310a. 310b arrive at the base station 306 during the allotted time slot for the mobile communication device 304. Likewise, the mobile communication device 302 may transmit data blocks 308a. 308b with a timing advance value 312. The timing advance value 312 may represent a time offset in which the mobile communication 302 should transmit the data blocks 308a, 308b so that the data blocks 308a. 308b arrive at the base station 306 during the allotted time slot for the mobile communication device 302. The timing advance values 312, 314 may initially be zero when the uplink connection is first established, but are periodically adjusted by the base station 306. In the example illustrated in the diagram 300, the timing advance value 312 is larger than the timing advance 314. This may indicate that the mobile communication device 302 is farther from the base station 306 than the mobile communication device 302. The difference in distance means the data blocks 308a, 308b take a longer time to reach the base station 306 than the data blocks 310a, 310b. Thus, the timing advance value 312 is greater to account for the additional time required for the data blocks 308a, 308b to reach the base station 306. Other factors that may influence the uplink timing include changes in the propagation environment, oscillation drift in the mobile communication device, and Doppler effects not related to a change in distance. The timing advance values 312, 314 may be stored on the mobile communication devices 302, 304 respectively.

The base station 306 may store a time tracking loop for each of the mobile communication devices 302, 304 and other devices camped on the base station 306. The time tracking loops may calculate timing advance adjustment values that are then sent to the mobile communication devices 302, 304. A timing advance value may be expressed as an integer, for example an integer between 0-63. Each integer may correspond to a unit of time, for example approximately a half microsecond (0.5 µs).

The base station 306 may periodically recalculate the uplink timing between the base station 306 and the mobile communication devices 302, 304. The base station 306 may determine a timing advance adjustment value for the mobile communication devices 302, 304 based on the uplink timing calculations. The base station 306 may generate a timing advance adjustment value for each of the mobile communication devices 302, 304. The timing advance adjustment value adjusts the timing advance value for the mobile communication devices 302, 304 based on the change in distance or other factors. The base station 306 sends the timing advance adjustment values to each of the mobile communication devices 302, 304, which may result in a change to the timing advance value stored on each of the mobile communication devices 302, 304.

Figure 4:
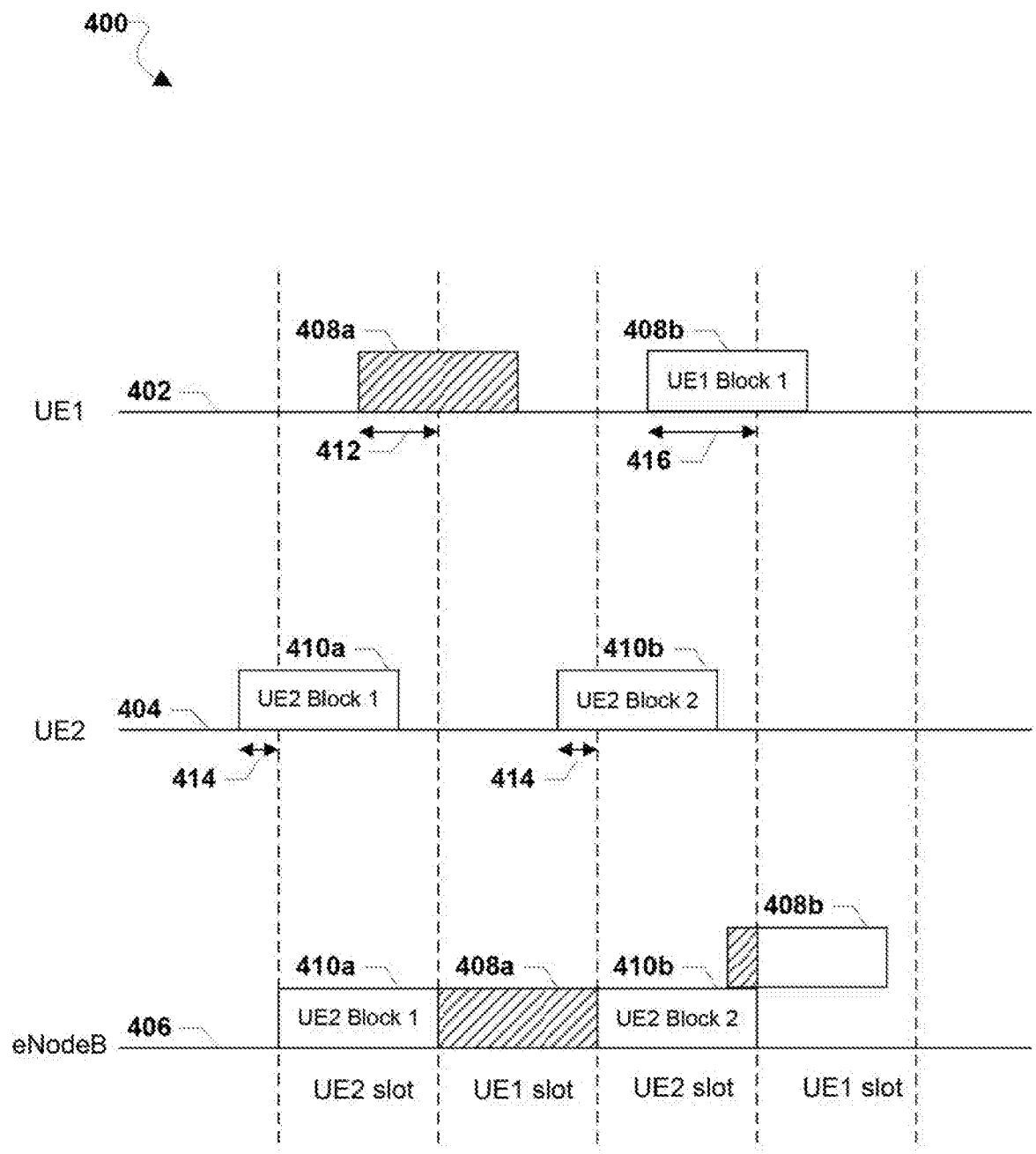
FIG. 4 is a timing diagram illustrating an error in determining timing advances for mobile communication devices in communication with a network base station.

Occasionally a base station may make errors in determining the timing advance adjustment values, which may lead to transmission collisions between mobile communication devices transmitting to the base station. FIG. 4 illustrates an example of an error in determined timing advance adjustment values. With reference to FIGS. 1-4, a timing diagram 400 shows uplink transmissions for a first mobile communication device 402 (e.g., 110, 200), labeled UE1, and a second mobile communication device 404, labeled UE2. The mobile communication devices 402 and 404 communicate with a base station 406 (e.g., 130, 140), labeled eNodeB. The mobile communication devices 402 and 404 are different distances away from the base station 406. For example, the mobile communication device 402 may be farther from base station 406 than the mobile communication device 404. The base station 406 allots specific time slots to receive transmissions from the mobile communication devices 402, 404, illustrated by vertical dashed lines in the diagram 400. The base station 406 may have time tracking loops that track the timing advance values for the mobile communication devices 402, 404.

The mobile communication device 404 may transmit data blocks 410a, 410b including a timing advance value 414. The timing advance value 414 may represent a time offset in which the mobile communication 404 should transmit the data blocks 410a, 410b so that the data blocks 410a, 410b arrive at the base station 406 during the allotted time slot for the mobile communication device 404. The mobile communication device 402 may be scheduled to transmit the data block 408a with a timing advance value 412. However, in the illustrated example, at that time the mobile communication device 402 performs a tune-away from the active subscription communicating with the base station 406 to another subscription communicating with another network. For example, the mobile communication device 402 may tune-away from an LTE subscription communicating with the base station 406 to a GSM subscription communicating with another base station. As a result, the data block 408a is not transmitted to the base station 406.

Once the tune-away is complete, the base station 406 may calculate an erroneous timing advance adjustment value for the mobile communication device 402 that does not correspond to the actual changes in the uplink timing. For example, the mobile communication device 402 may not have moved since before the tune-away, but the base station may calculate a positive timing advance adjustment value, indicating that the mobile communication device 402 has moved further away from the base station 406. The base station 406 may communicate the erroneous timing advance adjustment value to the mobile communication device 402. The mobile communication device adjusts the timing advance value 412 by the timing advance adjustment value, leading to a new timing advance value 416. In the example illustrated in the diagram 400, the timing advance value 416 is larger than the timing advance value 412, but the timing advance value 416 may also be smaller depending on the timing advance adjustment value calculated by the base station 406.

If the mobile communication device 402 transmits the data block 408b to the base station 406 using the timing advance value 416 as illustrated, the data block 408b arrives at the base station 406 before the end of the transmission of data block 410b by the mobile communication device 404. If that happens, the base station 406 may ignore the data block 408b because the data block 408b did not arrive at the allotted time slot. This results in a loss of the uplink connection between the mobile communication device 402 and the base station 406. It may take a long time for the uplink connection to be reestablished, and the base station may penalize the mobile communication device 402 by reducing the efficacy of the modulation and coding scheme used to communicate with the mobile communication device 402.

Figure 5:
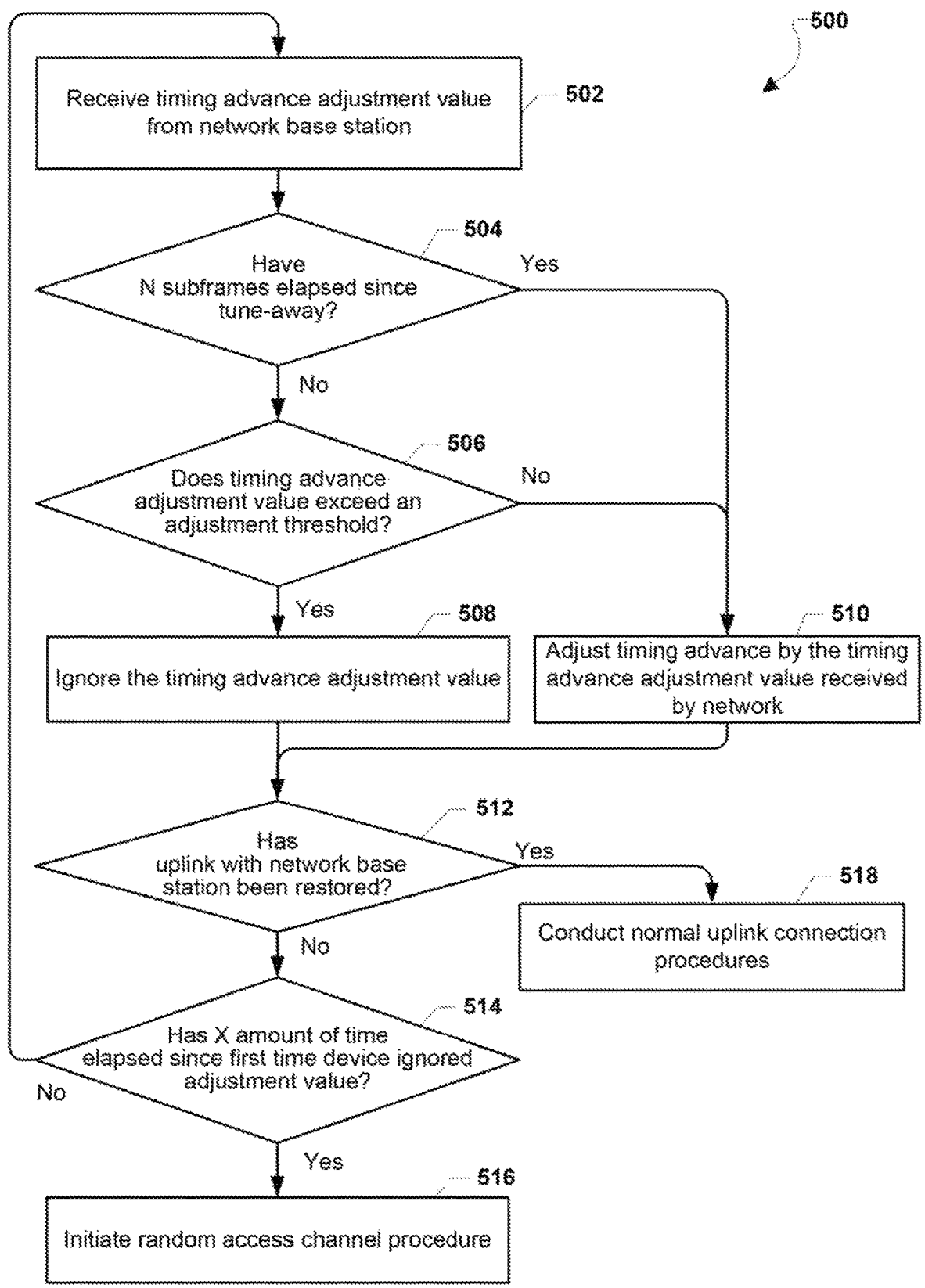
FIG. 5 is a process flow diagram illustrating a method for adjusting timing advance values on a mobile communication device according to various embodiments.

FIG. 5 illustrates a method 500 for adjusting timing advance values on a mobile communication device to avoid the problems that may occur when the base station transmits an erroneous timing advance adjustment value according to various embodiments. With reference to FIGS. 1-5, the method 500 may be implemented with a processor (e.g., the general processor 206, the baseband modem processor 216, a separate controller, and/or the like) of a mobile communication device (such as the multi-SIM communication devices 110, 120, and 200). The mobile communication device may have one RF resource that is shared by two or more subscriptions (a DSDS communication device).

In block 502, a mobile communication device processor may receive a timing advance adjustment value from a network base station. The timing advance adjustment value may be based on device determination of the uplink timing between the mobile communication device and the base station. The uplink timing may be determined by measuring the amount of time it takes for uplink signals sent by the mobile communication device to reach the base station. Changes in the uplink timing may be due to a number of factors, including changes in distance between the mobile communication device and the base station due to movement by the mobile communication device, changes in the propagation environment, oscillation drift in the mobile communication device, and Doppler effects not related to a change in distance. The base station may use a time tracking loop to track the uplink timing between the mobile communication device and the base station, and thus the timing advance adjustment value. Before receiving the timing advance adjustment value, the mobile communication device may have completed a tune-away from the subscription communicating with the base station to another subscription.

In determination block 504, the device processor may determine whether a predetermined number of sub-frames (e.g., N sub-frames) have elapsed since the end of the tune-away. This determination may be performed because erroneous calculations of the timing advance adjustment value are likely to occur shortly after a tune-away, and are not likely to occur a relatively long time (e.g., 100 milliseconds) after the tune-away is complete. Each sub-frame may last a certain amount of time, such as 10 milliseconds. For example, if N=10, then the total amount of time for N sub-frames may be approximately 100 milliseconds. In response to determining that the predetermined number of sub-frames have elapsed since the end of the tune-away (i.e., determination block 504="Yes"), the device processor may use the received timing advance adjustment value to adjust the timing advance value stored in the mobile communication device in block 510.

In response to determining that the predetermined number of sub-frames have not elapsed since the end of the tune-away (i.e., determination block 504="No"), the device processor may determine whether the timing advance adjustment value exceeds an adjustment threshold in determination block 506. The adjustment threshold may be set at a value consistent with a maximum distance that the mobile communication device could reasonably travel during the time span of a tune-away (e.g., a time span of a few seconds). For example, the adjustment threshold may be set at 3, 4, or 5. The adjustment threshold prevents the mobile communication device from accepting timing advance adjustment values that are too large, for example adjustment values that represent a physical impossibility.

In response to determining that the timing advance adjustment value does not exceed the adjustment threshold (i.e., determination block 506="No"), the device processor may adjust the timing advance value stored in the mobile communication device by the timing advance adjustment value received from the network in block 510. In other words, if the timing advance adjustment value is reasonable (does not exceed the threshold), the mobile communication device may utilize the timing advance adjustment value.

In response to determining that the timing advance adjustment value exceeds the adjustment threshold (i.e., determination block 506="Yes"), the device processor may ignore the timing advance adjustment value received from the base station in block 510. In other words, upon determining that the timing advance adjustment value is probably erroneous, the mobile communication device may not adjust the prior timing advance value stored by the mobile communication device.

After either adjusting the timing advance value by the timing advance adjustment value in block 510 or ignoring the timing advance adjustment value in block 508, the device processor may determine whether the uplink connection with the network base station has been restored. In response to determining that the uplink connection with the base station has been restored (i.e., determination block 512="Yes"), the device processor may carry on with normal uplink connection procedures in block 518.

In response to determining that the uplink connection with the base station has not been restored (i.e., determination block 512="No"), the device processor may determine whether a predetermined amount of time X has passed since the first time the mobile communication device ignored a timing advance adjustment value sent by the base station in determination block 514. The predetermined amount of time X may be on the order of a few milliseconds, for example 20 milliseconds. The predetermined amount of time may represent a time limit on establishing an uplink connection with the base station through changing the timing advance value based on timing advance adjustment values received from the base station.

In response to determining that the predetermined amount of time has not passed since the first time the mobile communication device ignored a timing advance adjustment value sent by the base station (i.e., determination block 514="No"), the device processor may continue to operate as normal to establish an uplink connection including receiving another timing advance adjustment value from the network base station in block 502. In other words, as long as the predetermined amount of time has not elapsed, the mobile communication device may continue establishing the uplink connection with the network by changing the timing advance value based on timing advance adjustment values received from the base station.

In response to determining that the predetermined amount of time has passed since the first time the mobile communication device ignored a timing advance adjustment value sent by the base station (i.e., determination block 514="Yes"), the device processor may initiate a random access channel (RACH) procedure for reestablishing the uplink connection with the base station. A RACH procedure is used by mobile devices to access a mobile network, and may be used as a last resort to reestablish the connection with the base station. The mobile communication device may perform a number of RACH communications before the regular uplink connection is restored.

Figure 6:
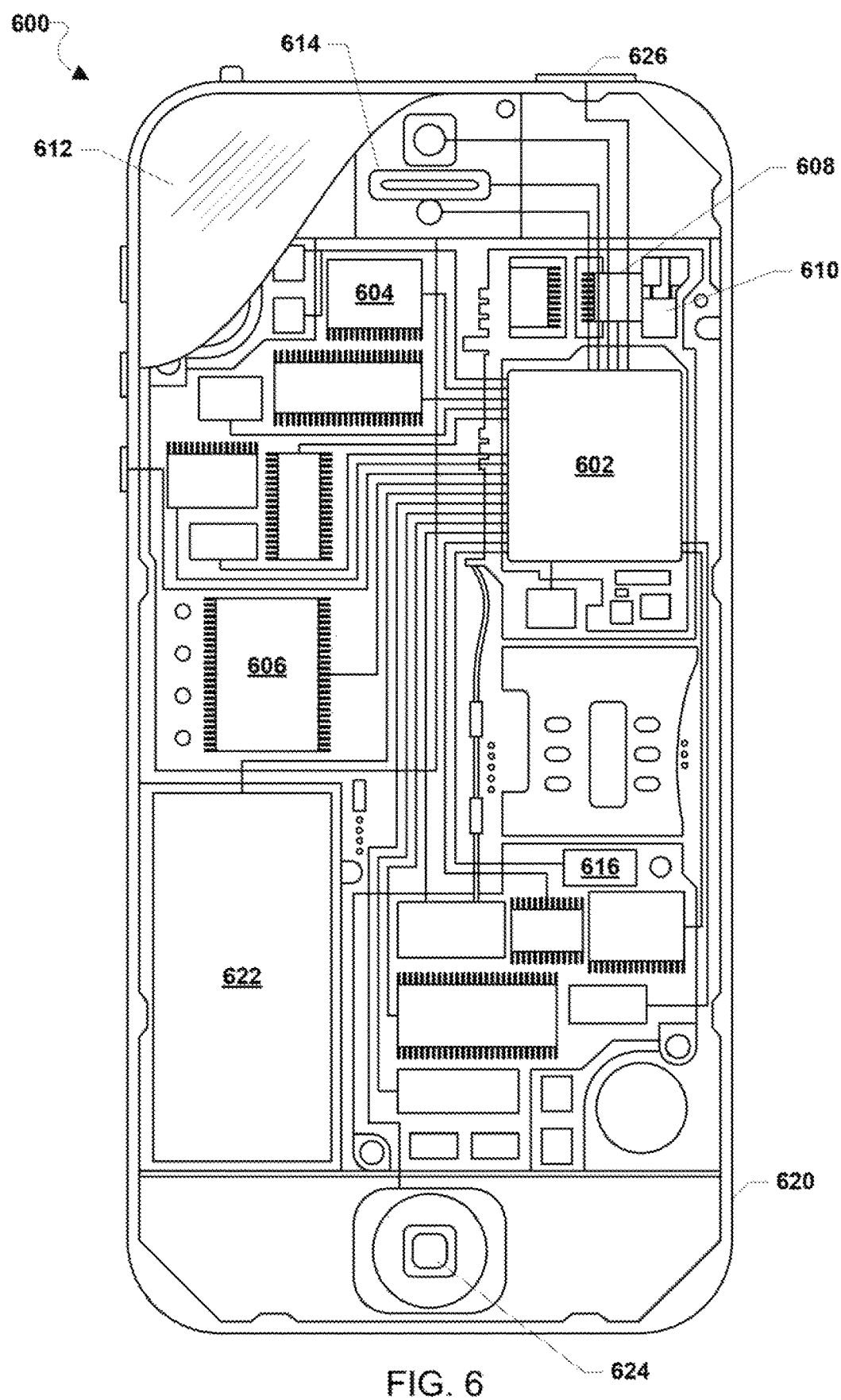
FIG. 6 is a component block diagram of a mobile communication device suitable for implementing some embodiment methods.

Various embodiments may be implemented in any of a variety of multi-SIM communication devices, an example of which (e.g., multi-SIM communication device 600) is illustrated in FIG. 6. With reference to FIGS. 1-6, the multi-SIM communication device 600 may be similar to the multi-SIM communication devices 110, 120, 200 and may implement the method 500.

The multi-SIM communication device 600 may include a processor 602 coupled to a touchscreen controller 604 and an internal memory 606. The processor 602 may be one or more multi-core integrated circuits designated for general or specific processing tasks. The internal memory 606 may be volatile or non-volatile memory, and may also be secure and/or encrypted memory, or unsecure and/or unencrypted memory, or any combination thereof. The touchscreen controller 604 and the processor 602 may also be coupled to a touchscreen panel 612, such as a resistive-sensing touchscreen, capacitive-sensing touchscreen, infrared sensing touchscreen, etc. Additionally, the display of the multi-SIM communication device 600 need not have touch screen capability.

The multi-SIM communication device 600 may have one or more cellular network transceivers 608 coupled to the processor 602 and to one or more antennas 610 and configured for sending and receiving cellular communications. The one or more transceivers 608 and the one or more antennas 610 may be used with the above-mentioned circuitry to implement various embodiment methods. The multi-SIM communication device 600 may include one or more SIM cards 616 coupled to the one or more transceivers 608 and/or the processor 602 and may be configured as described above.

The multi-SIM communication device 600 may also include speakers 614 for providing audio outputs. The multi-SIM communication device 600 may also include a housing 620, constructed of a plastic, metal, or a combination of materials, for containing all or some of the components discussed herein. The multi-SIM communication device 600 may include a power source 622 coupled to the processor 602, such as a disposable or rechargeable battery. The rechargeable battery may also be coupled to the peripheral device connection port to receive a charging current from a source external to the multi-SIM communication device 600. The multi-SIM communication device 600 may also include a physical button 624 for receiving user inputs. The multi-SIM communication device 600 may also include a power button 626 for turning the multi-SIM communication device 600 on and off.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory. CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to some embodiments without departing from the spirit or scope of the written description. Thus, the present disclosure is not intended to be limited to the embodiments shown herein but is to be accorded the widest scope consistent with the following claims and the principles and novel features disclosed herein.

What is claimed is:

1. A method for adjusting timing advance values on a mobile communication device, comprising:
    determining whether a timing advance adjustment value is received after a predetermined number of sub-frames have elapsed after a tune-away from a base station by the mobile communication device is completed;
    determining whether the timing advance adjustment value that is received by the mobile communication device exceeds an adjustment threshold that indicates a maximum acceptable timing advance adjustment value in response to determining that the timing advance adjustment value is received after the predetermined number of sub-frames have not elapsed after the tune-away is completed; and ignoring the timing advance adjustment value received by the mobile communication device, wherein the mobile device does not use the received timing advance adjustment value to transmit a signal, in response to determining that the timing advance adjustment value exceeds the adjustment threshold.

2. The method of claim 1, further comprising adjusting the timing advance value on the mobile communication device by the timing advance adjustment value in response to determining that the timing advance adjustment value does not exceed the adjustment threshold.

3. The method of claim 1, further comprising:
adjusting the timing advance value on the mobile communication device by the timing advance adjustment value in response to determining that the timing advance adjustment value is received after a predetermined number of sub-frames have elapsed after the tune-away is completed.

4. The method of claim 1, further comprising:
determining whether the mobile communication device has reestablished an uplink connection with a network after a predetermined amount of time after ignoring the timing advance adjustment value; and
performing a random channel access procedure in response to determining that the mobile communication device has not reestablished the uplink connection with the network after the predetermined amount of time after ignoring the timing advance adjustment value.

5. The method of claim 1, wherein ignoring the timing advance adjustment value comprises utilizing a timing advance value previously stored on the mobile communication device to communicate with a base station.

6. The method of claim 1, wherein the adjustment threshold is a value consistent with a maximum distance that the mobile communication device could reasonably travel during a specified time frame.

7. A mobile communication device comprising:
a radio frequency (RF) resource;
a memory; and
a processor coupled to the RF resource and the memory, configured to connect to two or more Subscriber Identity Module (SIM) modules, and configured with processor-executable instructions to:
determine whether a timing advance adjustment value is received after a predetermined number of sub-frames have elapsed after a tune-away from a base station by the mobile communication device is completed;
determine whether the timing advance adjustment value that is received by the mobile communication device exceeds an adjustment threshold that indicates a maximum acceptable timing advance adjustment value in response to determining that the timing advance adjustment value is received after the predetermined number of sub-frames have not elapsed after the tune-away is completed; and
ignore the timing advance adjustment value received by the mobile communication device, wherein the mobile device does not use the received timing advance adjustment value to transmit a signal, in response to determining that the timing advance adjustment value exceeds the adjustment threshold.

8. The mobile communication device of claim 7, wherein the processor is further configured with processor-executable instruction to adjust the timing advance value by the timing advance adjustment value in response to determining that the timing advance adjustment value does not exceed the adjustment threshold.

9. The mobile communication device of claim 7, wherein the processor is further configured with processor-executable instruction to:
adjust the timing advance value by the timing advance adjustment value in response to determining that the timing advance adjustment value is received after a predetermined number of sub-frames have elapsed after the tune-away is completed.

10. The mobile communication device of claim 7, wherein the processor is further configured with processor-executable instruction to:
determine whether the mobile communication device has reestablished an uplink connection with a network after a predetermined amount of time after ignoring the timing advance adjustment value; and
perform a random channel access procedure in response to determining that the mobile communication device has not reestablished the uplink connection with the network after the predetermined amount of time after ignoring the timing advance adjustment value.

11. The mobile communication device of claim 7, wherein the processor is further configured with processor-executable instruction to ignore the timing advance adjustment value by utilizing a timing advance value previously stored in the memory to communicate with a base station.

12. The mobile communication device of claim 7, wherein the adjustment threshold is a value consistent with a maximum distance that the mobile communication device could reasonably travel during a specified time frame.

13. A mobile communication device, comprising:
means for determining whether a timing advance adjustment value is received after a predetermined number of sub-frames have elapsed after a tune-away from a base station by the mobile communication device is completed;
means for determining whether the timing advance adjustment value that is received by the mobile communication device exceeds an adjustment threshold that indicates a maximum acceptable timing advance adjustment value in response to determining that the timing advance adjustment value is received after the predetermined number of sub-frames have not elapsed after the tune-away is completed; and
means for ignoring the timing advance adjustment value received by the mobile communication device, wherein the mobile device does not use the received timing advance adjustment value to transmit a signal, in response to determining that the timing advance adjustment value exceeds the adjustment threshold.

14. A non-transitory processor-readable storage medium on which are stored processor-executable instructions configured to cause a processor of a mobile communication device to perform operations:
determining whether a timing advance adjustment value is received after a predetermined number of sub-frames have elapsed after a tune-away from a base station by the mobile communication device is completed;
determining whether the timing advance adjustment value that is received by the mobile communication device exceeds an adjustment threshold that indicates a maximum acceptable timing advance adjustment value in response to determining that the timing advance adjustment value is received after the predetermined number of sub-frames have not elapsed after the tune-away is completed; and ignoring the timing advance adjustment value received by the mobile communication device, wherein the mobile device does not use the received timing advance adjustment value to transmit a signal, in response to determining that the timing advance adjustment value exceeds the adjustment threshold.

15. The non-transitory processor-readable storage medium of claim 14, wherein the stored processor-executable instructions are configured to cause a processor of a mobile communication device to perform operations further comprising adjusting the timing advance value on the mobile communication device by the timing advance adjustment value in response to determining that the timing advance adjustment value does not exceed the adjustment threshold.

16. The non-transitory processor-readable storage medium of claim 14, wherein the stored processor-executable instructions are configured to cause a processor of a mobile communication device to perform operations further comprising:

adjusting the timing advance value on the mobile communication device by the timing advance adjustment value in response to determining that the timing advance adjustment value is received after a predetermined number of sub-frames have elapsed after the tune-away is completed.

17. The non-transitory processor-readable storage medium of claim 14, wherein the stored processor-executable instructions are configured to cause a processor of a mobile communication device to perform operations further comprising:

determining whether the mobile communication device has reestablished an uplink connection with a network after a predetermined amount of time after ignoring the timing advance adjustment value; and performing a random channel access procedure in response to determining that the mobile communication device has not reestablished the uplink connection with the network after the predetermined amount of time after ignoring the timing advance adjustment value.

18. The non-transitory processor-readable storage medium of claim 14, wherein the stored processor-executable instructions are configured to cause a processor of a mobile communication device to perform operations such that ignoring the timing advance adjustment value comprises utilizing a timing advance value previously stored on the mobile communication device to communicate with a base station.

19. The non-transitory processor-readable storage medium of claim 14, wherein the adjustment threshold is a value consistent with a maximum distance that the mobile communication device could reasonably travel during a specified time frame.

* * * * *